United States Patent [19]
Hayashi

[11] Patent Number: 5,978,106
[45] Date of Patent: Nov. 2, 1999

[54] PICTURE IMAGE PROCESSING METHOD

[75] Inventor: Nobuhiro Hayashi, Tokyo, Japan

[73] Assignee: Nikon Corporation, Tokyo, Japan

[21] Appl. No.: 08/858,376

[22] Filed: May 19, 1997

[30] Foreign Application Priority Data

Jun. 21, 1996 [JP] Japan ................................. 8-161516

[51] Int. Cl.⁶ .................................................. H04N 1/40
[52] U.S. Cl. .................................................... 358/518
[58] Field of Search .................................... 358/518, 521,
358/523, 537, 456, 464, 462, 458, 76, 54;
382/100, 254, 192

[56] References Cited

U.S. PATENT DOCUMENTS

| | | | |
|---|---|---|---|
| 4,364,084 | 12/1982 | Akimoto et al. | 358/76 |
| 4,792,979 | 12/1988 | Nomura et al. | 382/254 |
| 4,899,216 | 2/1990 | Tasumi et al. | 358/521 |
| 5,410,418 | 4/1995 | Yonezawa | 358/456 |

*Primary Examiner*—Jose L. Couso
*Assistant Examiner*—Duy M. Dang
*Attorney, Agent, or Firm*—Oliff & Berridge, PLC

[57] ABSTRACT

In a picture image processing method, a correction gradation conversion table is created in order to correct the color balance. Next, a basic negative gradation conversion table (NegaTable1) and the correction gradation conversion table are merged into a look-up table and a new gradation conversion table is created. A main scan is then performed. The method accomplishes negative-positive conversion so that the color balance is not destroyed.

11 Claims, 4 Drawing Sheets

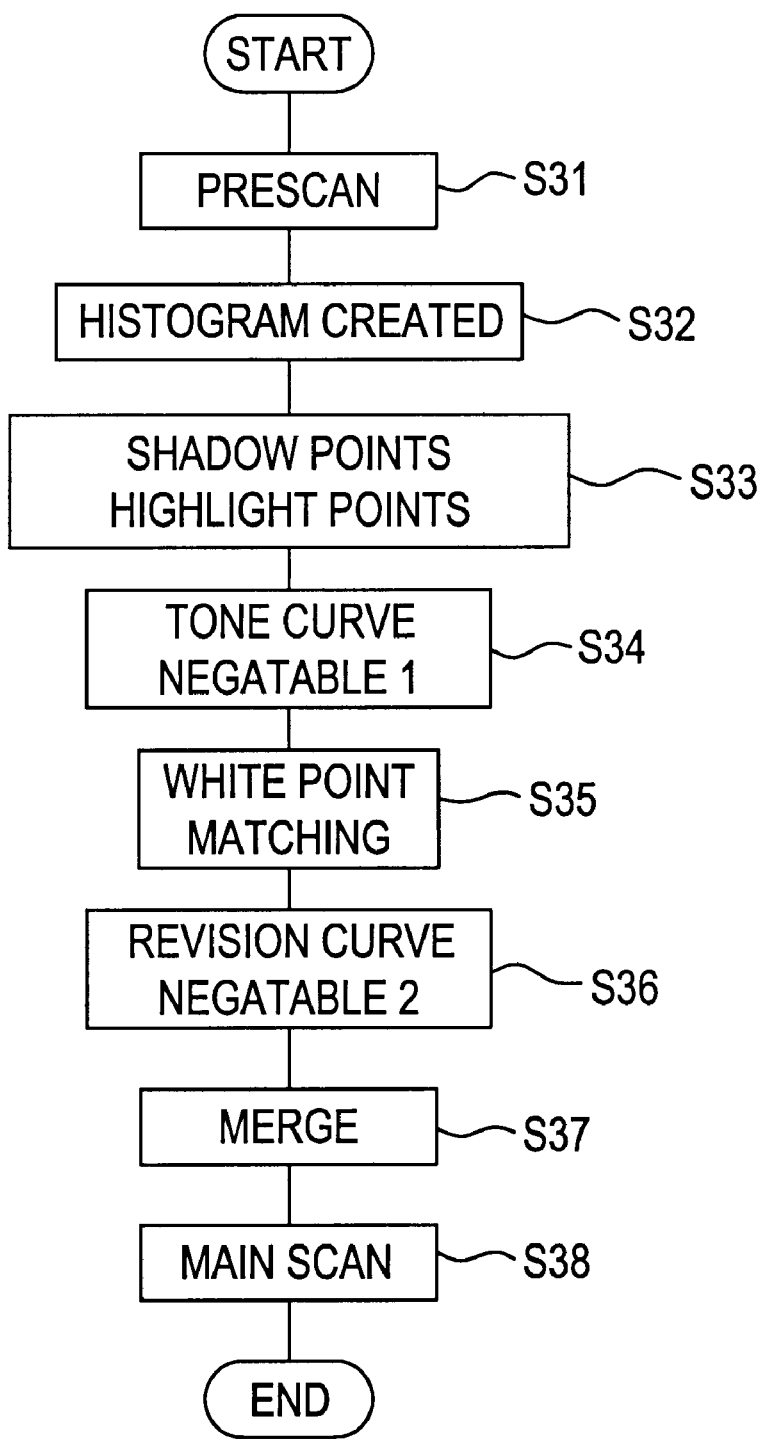

PICTURE IMAGE PROCESSING METHOD

BACKGROUND OF THE INVENTION

1. Field of Invention

The present invention relates to a picture image processing method which processes a picture image of an original medium that has been optically input.

2. Description of Related Art

A picture image input apparatus (e.g., a scanner) optically inputs and photoelectrically converts a picture image of an original medium, and outputs this picture image as electronic data. In this kind of scanner, when the picture image of an original medium is input, a lookup table is necessary in order to reproduce the object image. This look-up table is, for example, one in which a table used to correct variances characteristic of the apparatus and a table used for picture image adjustment according to commands from the user are merged.

In the picture image input of a negative original medium (negative film), which is a transmissive original medium, the negative gradation conversion table used to convert the negative to a positive is also merged into the look-up table. The negative film has light and dark gradation or coloration opposite that of the object.

Furthermore, in the picture image input of a negative film, it is necessary to perform a prescan in order to create this negative gradation conversion table. This prescan performs the same actions as the normal scan during picture image input, with the exception of using a default look-up table to create a look-up table.

This negative gradation conversion table creation is started, for example, by commands from a host computer to which the scanner is connected.

First, the scanner receives from the host computer the resolution, the picture image input range and the data in the look-up table into which the negative gradation conversion table of linear properties which is the basis is merged. The scanner, upon receiving from the host computer a command to start scanning, then starts the prescan.

Next, the scanner creates a histogram of the brightness of the input picture image and the frequency thereof from the picture image data input through the prescan.

A shadow point used to match the white point is found from this histogram. The white point is the location where the value of the output of the negative gradation conversion table is a maximum. In addition, the shadow point is the darkest location on the negative film, and is the brightest location in the original object. That is to say, the white point is the brightest location in the original object, and is the point which should be the brightest location in the data from the negative-to-positive conversion of the picture image which was input.

The negative gradation conversion table shown in FIGS. 5A and 5B is created using the shadow points and highlight points found as described above. FIG. 5A shows the basic negative gradation conversion table which is the basis of the initial state when picture image input of the negative film is accomplished. In addition, FIG. 5B shows the negative gradation conversion table transformed by the results of the above-described prescan.

If n is the number of bits in the negative gradation conversion table, the negative gradation conversion table has an output value that is an integer in the range from 0 to N for an input value in the range from 0 to N, where $N=2^n-1$.

In the basic negative gradation conversion table shown in FIG. 5A, the data which is obtained by photographing a gray scale with a commonly known change in density using a predetermined negative film and inputting this into the scanner is set so as to reproduce the density change of the original gray scale.

Accordingly, this basic negative gradation conversion table is one which provides an output value "out" for a given input value "in", and can be approximately defined as shown in equation (1) below.

$$\text{out} = f(\text{in}) \tag{1}$$

Here, $f(0)=N$, and in addition, $f(N)=0$.

By performing white point matching for each of RGB following this basic negative gradation conversion table, equation (2) below results.

$$\text{out} = f(\text{in}) = N, \ (0 \leq \text{in} < S)$$

$$\text{out} = f((\text{in}-S_R) \cdot N/(N-S_R))$$

$$\text{out} = f((\text{in}-S_G) \cdot N/(N-S_G))$$

$$\text{out} = f((\text{in}-S_B) \cdot N/(N-S_B)), \ (S \leq \text{in} < N) \tag{2}$$

As shown in FIG. 5B, the negative gradation conversion tables 51, 52 and 53 having $S_R$, $S_G$, and $S_B$ as the shadow points result. In FIG. 5B, H is the highlight point. The highlight point is the brightest location on the negative film, but is the darkest location in the original object.

In the scanner, the negative gradation conversion table obtained in this manner is merged with the look-up table, and the picture image data input through the actual picture image input is converted using this and is transferred to the host computer.

However, when the shadow point of the negative gradation conversion table is caused to coincide with the white point of the negative film as described above, the gradient of the negative gradation conversion table becomes more steep the higher the value of the shadow point.

For example, as shown in FIG. 5B, the shadow point $S_G$ of G is a higher value than the shadow point $S_R$ of R. Consequently, the negative gradation conversion table 52 has a steeper gradient than the negative gradation conversion table 51.

When the negative-positive conversion is accomplished using the negative gradation conversion tables, the post-conversion value becomes lower than the shadow point the higher the pre-conversion value.

Consequently, the brightness under the conversion by the negative gradation conversion table 52 having a steep gradient falls more severely than the brightness under the conversion with the negative gradation conversion table 51.

As a result, white is reproduced as white, but the brightness of G is lower than that of R and B in gray regions farther from white, so that the problem arises that the picture image which has been converted has a purplish red hue.

SUMMARY OF THE INVENTION

The present invention overcomes the problems and disadvantages of the related art and makes it possible to accomplish negative-positive conversion so that the color balance is not destroyed.

The picture image processing method of the present invention is one wherein the picture image data of a negative picture image is input by being decomposed into a plurality of colors and the substantially minimum brightness values of the input picture image data corresponding to each of the plurality of colors are respectively extracted as shadow points. A base gradation conversion table which outputs a maximum value at least in accordance with the respective shadow points is created for each of the plurality of colors and a correction gradation conversion table which can be merged with the respective base gradation conversion table is created for each of the plurality of colors.

Furthermore, this picture image processing method respectively creates the correction gradation conversion tables so that the difference in the gradients of the post-merge gradation conversion tables is smaller than the difference in the gradients of the respective base gradation conversion tables in the region in which the output value of the post-merge gradation conversion table, created by merging the correction gradation conversion table into the base gradation conversion table, is a predetermined value or greater.

As a result, if gradation conversion is accomplished using the basic gradation conversion table and correction gradation conversion table in each of the colors in color decomposition, the white balance is maintained in the bright region of the object which has been photographed onto the negative original medium, and it is possible to accomplish negative-positive conversion without destroying the color balance.

BRIEF DESCRIPTION OF THE DRAWINGS

FIG. 3 is a flowchart relating to the creation of the negative gradation conversion table.

DETAILED DESCRIPTION OF THE PREFERRED EMBODIMENT

Hereafter, an embodiment of the present invention will be described with reference to the drawings.

Figure 1:
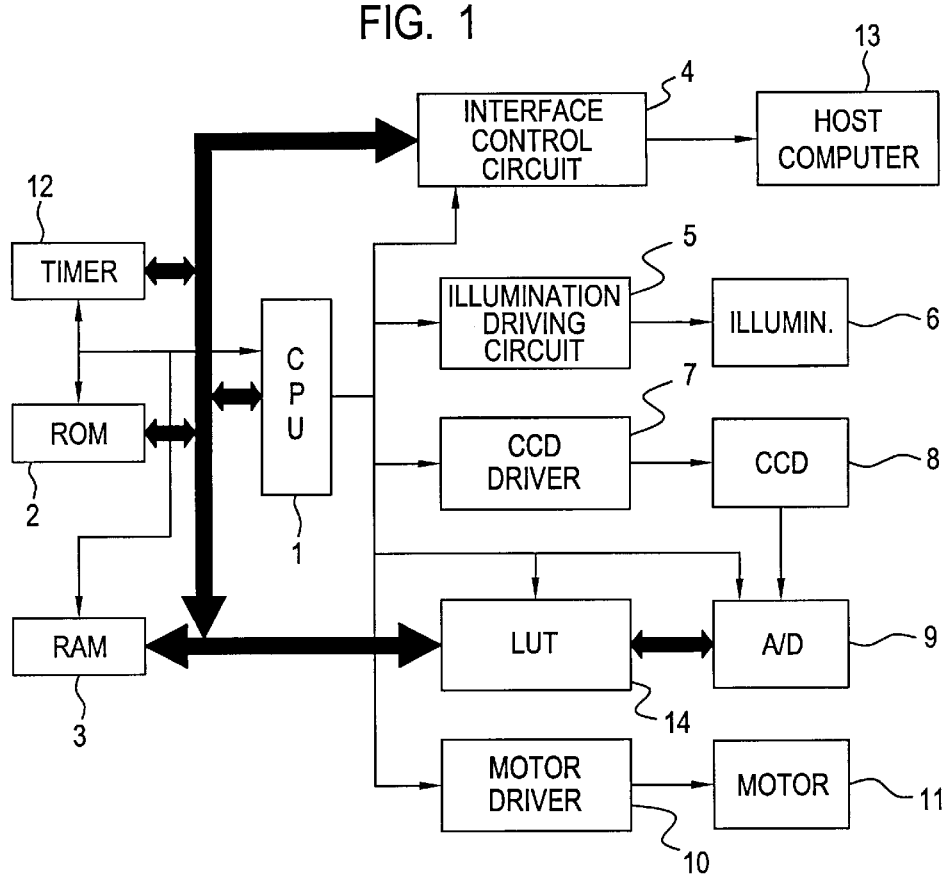
FIG. 1 is a diagram showing the composition of a picture image input system in an embodiment of the present invention.

As shown in FIG. 1, a CPU 1 controls the actions of the various components and executes the picture image input actions following a program stored in a ROM 2. In a RAM 3, the CPU 1 temporarily stores data and the like which are necessary in executing the various processes.

An interface circuit 4 is connected to a host computer 13 and outputs to the host computer 13 data which has been input. Interface circuit 4 also receives and transfers to the CPU 1 instructions and commands from the host computer 13.

An illumination driving circuit 5 is controlled by the CPU 1, drives an illumination apparatus 6, and causes light which is red R, green G and blue B to illuminate the original medium which is the object of picture image input. The assumption for the original medium is that a negative film which is a transmissive original medium is used as the negative original medium, although such is not represented in the drawings.

A CCD driving circuit 7 is controlled by the CPU 1 and reads the original medium by driving a CCD 8. Furthermore, the picture image data output from the CCD 8 is input into an A/D conversion circuit 9 and after undergoing A/D conversion is sent to the RAM 3 and stored there. Furthermore, this data undergoes a conversion process by a look-up table 14.

In addition, a motor driving circuit 10 is controlled with a preset timing by the CPU 1 and causes the original medium to move in increments of one line by driving a motor 11. A timer 12 temporarily performs a timing action and supplies the time information to the CPU 1.

This is the composition of the scanner, with the exception of the above-described host computer 13.

Next, the basic actions of this picture image input system will be described using the flowchart in FIG. 2.

First, in step S21, the CPU 1 causes the illumination apparatus 6 to be driven by controlling the illumination driving circuit 5. Through this, the illumination apparatus 6 first illuminates the original medium with R light. Furthermore, the CPU 1 starts measuring this R light illumination time using the time information simultaneously obtained from the timer 12.

On the other hand, the CPU 1 causes the CCD 8 to be driven by controlling the CCD driving circuit 7, and accomplishes input of the original medium picture image through illumination by the illumination apparatus 6. Through this, the CCD 8 accumulates the light corresponding to the R picture image of one line.

Next, in step S22, the CPU 1 determines whether or not the measured time is a preset value. That is to say, the CPU 1 determines whether or not the preset illumination time has been completed.

When the CPU 1 determines that the preset illumination time has been completed, the program moves to step S23 and the CPU 1 causes the illumination apparatus 6 to halt by controlling the illumination driving circuit 5, and the illumination is completed. When the illumination time is not completed, the CPU 1 continues to cause the illumination apparatus 6 to be driven by controlling the illumination driving circuit 5.

Next, in step S24, the CPU 1 causes the R data accumulated in the CCD 8 to be output to the A/D conversion circuit 9. Furthermore, the CPU 1 causes the R data received by the A/D conversion circuit 9 to undergo A/D conversion. Furthermore, the CPU 1 sends the data which has been A/D converted to the RAM 3 and stores this data there.

Furthermore, in step S25, the CPU 1 determines whether or not the above-described data input has been completed in all of the colors RGB. Furthermore, when it is determined that this has been completed in all colors, the program moves to the ensuing step S26.

That is to say, the above-described series of actions consisting of light illumination, picture image input, A/D conversion and data storage is performed for the three colors RGB, and following this the program moves to the ensuing step S26.

Next, the CPU 1, in step S26, performs a conversion process on the data stored in the RAM 3 using the look-up table 14.

When this conversion process has been completed, the CPU 1, in step S27, sends the data which has undergone the conversion process to the host computer 13 via the interface control circuit 4. Through this, inputting of one line of picture image data is accomplished.

Furthermore, the CPU 1 supplies the line start trigger signal to the motor driving circuit 10, and causes the motor 11 to be driven to cause the relative position between the original medium and the CCD 8 to move by one line. Furthermore, the actions in above-described steps S21 through S27 are repeated and the picture image input of the next one line is accomplished. By repeating the above for a predetermined number of lines, the picture image data for the whole original medium is input.

Next, the creation of the negative gradation conversion table in this embodiment will be described.

In the above-described picture image input system, a negative picture image input set up is accomplished. Furthermore, in order to obtain the information needed for this set up, picture image input is broadly accomplished by performing a prescan in the picture image input system and the above-described look-up table 14 is created.

The creation of this look-up table 14 is accomplished as shown in the flowchart in FIG. 3.

First, in step S31, the CPU 1 inputs a picture image through a prescan in accordance with a program stored in the ROM 2. In this prescan, picture image input is performed using a negative gradation conversion table with linear properties as the base which is prepared beforehand in the look-up table 14. This range of the picture image input by the prescan is basically the region wherein the horizontal and vertical lengths of the picture image input region set by the user are shrunk to 90% uniformly left-to-right and up-and-down.

When the minimum input range is determined and the picture image input region is set smaller than this, the prescan is accomplished by extending the region to the minimum input range uniformly in each direction.

In addition, when the picture image input region which is set is in a corner of the entire region and cannot be extended uniformly to the minimum input range, the region is extended in the directions in which extension is possible.

The resolution of the picture image input in this prescan is determined in accordance with the size of the picture image input region set by the user. When this picture image input region is small, the resolution is high. In addition, when this picture image input region is large, the resolution is set low.

Through this, situations are avoided in which the number of pixels in the input picture image is too small and a histogram having the necessary information cannot be obtained, or in which the scanning time becomes excessively long because of a larger number of pixels than necessary in the input picture image.

Furthermore, the CPU 1, in step S32, creates a histogram through the picture image data input by the prescan. That is to say, the histogram is created for each of RGB by adding the number of pixels at each brightness level through the picture image input by the prescan.

Furthermore, in step S33, the CPU 1 finds the shadow point in order to accomplish white point matching after negative-positive reversal has been accomplished.

In addition, the CPU 1 finds the highlight point in order to cause the scale of the brightness values output from the scanner to coincide among RGB.

In step S33, the frequency value is added toward the high direction from level 0 in the histogram, and the value immediately prior to the cumulative frequency value exceeding 0.03% (cumulative frequency coefficient 1) of the total number of pixels is set as the shadow point $S_c$ (c=R, G, B).

Conversely, the frequency value is added from the maximum level (4095 in the case of a 12-bit table) in the low direction, and the value immediately prior to where the cumulative frequency value crosses 0.03% (cumulative frequency coefficient 2) of the total is made the highlight point $H_c$ (c=R, G, B). Furthermore, these are respectively found for each of RGB.

In step S34, the CPU 1 creates "NegaTable1" which indicates the subjective tone curve in order to create the negative gradation conversion table (NegaTable).

In a basic negative gradation conversion table which outputs n bits for an input of n bits, the same subjective tone curve as in conventional scanners is used. This can be approximated as shown hereafter using a predetermined function f(in) in which f(0)=N and f(N)=0.
f(in)=N, (0≦in <S)
f(in)=N·{(N−in)/N−S)}³, (S<in≦N)
Here, S is the shadow point, and $N=2^n-1$.

Next, the CPU 1, in step S35, performs white point matching for RGB using the table (NegaTable1) indicated by this function f(in).

This white point matching can be as shown below.
NegaTable1[in]=N, (0≦in<S)
NegaTable1[in]=f((in−S)·N/(N−S)), (S≦in<N)

Figure 4A:
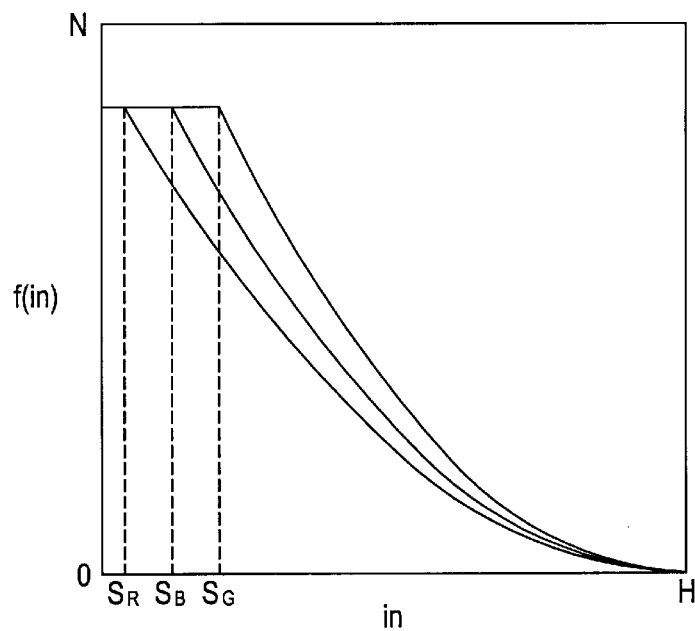
FIGS. 4A and 4B are explanatory diagrams showing the negative gradation conversion table in the embodiment of the present invention.

Conventionally, the negative gradation conversion table was set using this "NegaTable1" (FIG. 4A) without change, but this caused the problem that the coloration changed depending on the position of the shadow point.

For example, when the shadow point $S_G$ of G (green) is higher than that of R (red) or B (blue), the gradient of the subjective tone curve is higher than the others. Consequently, when negative-positive reversal is accomplished using this negative gradation conversion table, the picture image has a magenta hue when the input picture image is reproduced. This is because the brightness of the highlight portion of G in the object used to obtain the negative film falls rapidly from white and has a relatively low brightness in comparison with the other colors.

Consequently, in the present embodiment, in step S36 the CPU 1 creates a correction gradation conversion table in order to correct the color balance.

Furthermore, the CPU 1, in step S37, merges the basic negative gradation conversion table (NegaTable1) and the correction gradation conversion table into the look-up table 14, and creates a new gradation conversion table. Furthermore, in step S38, the main scan is performed.

Figure 2:
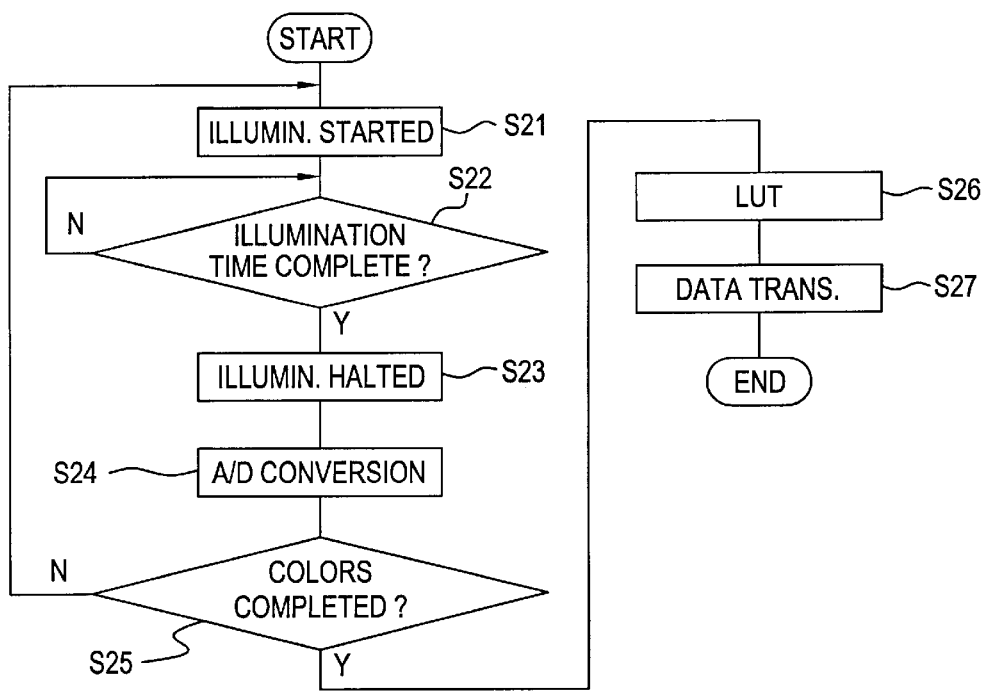
FIG. 2 is a flowchart showing the basic actions of the picture image input system of FIG. 1.

The main scan accomplishes the processes shown in the above-described flowchart in FIG. 2. Furthermore, in the process in step S26 in the flowchart of FIG. 2, gradation conversion of the picture image data is accomplished using the gradation conversion table created in step S37 of FIG. 3.

The "NegaTable2" which shows this correction gradation conversion table, may prepare a function indicating a concave up curve such as that indicated below, for example, for each of RGB.
NegaTable2[in]=N·(in/N)^γ

Furthermore, this correction gradation conversion table is merged into the basic negative gradation conversion table, as shown hereafter, resulting in the negative gradation conversion table used in the actual negative picture image input.
NegaTable [in]
=NegaTable2[NegaTable1[1]]
=N(f((in−$S_c$)·N(N−$S_c$)/N)·γ, (S≦in≦N)
NegaTable[in] =N, (0≦in<S)

However, the above-described change in coloration is striking in the highlight portion of the object used to obtain the negative film, and very little effect is received on the shadow side.

Consequently, the correction gradation conversion table is created so that, for example, in the range where the output value of the negative gradation conversion table has fallen to ½ of the maximum value, the downward condition of the curve of the negative gradation conversion table is the same for RGB regardless of the position of the white point.

At this time, the scale of brightness input by the exposure in picture image input is not constant. That is to say, the difference in brightness in one step of brightness for R and in one step of brightness for G are not necessarily the same.

Consequently, in the CPU 1, $\gamma$ is determined as indicated hereafter so as to make these scales coincide.

Here, $\gamma$ is determined so that when a value $(S_c+k \cdot H_c)$ higher than the shadow point by $k \cdot H_c$, which is the width of brightness from 0 to the highlight point multiplied by the coefficient k, is input, the output is N/2.

That is to say, the value of $\gamma$ is determined so that when $S_c+k \cdot H_c$ is input into "NegaTable1" and the output therefrom is input into "NegaTable2", the output from the scanner becomes N/2. The value of k is selected so that a suitable brightness is obtained when an average picture image is reproduced using "NegaTable1".

Figure 4B:
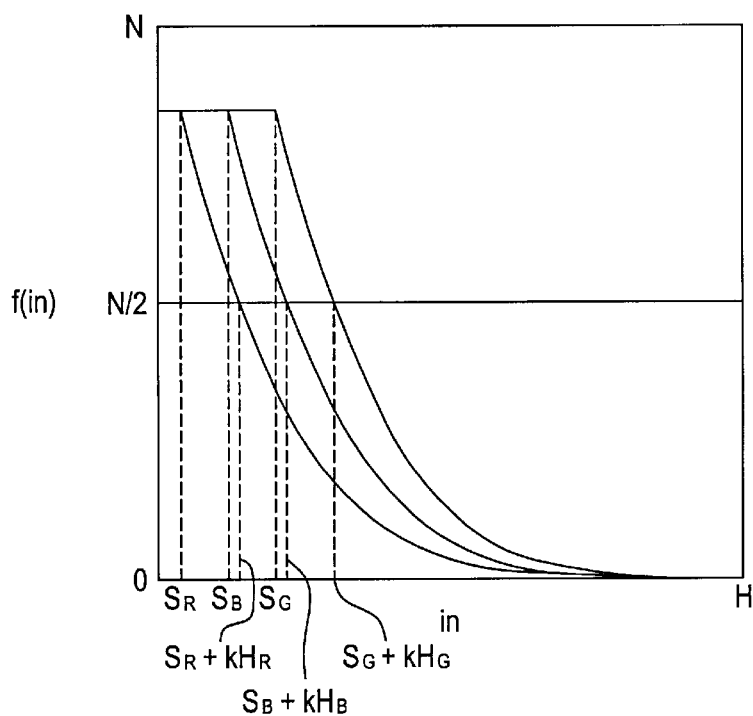
Figure 5A:
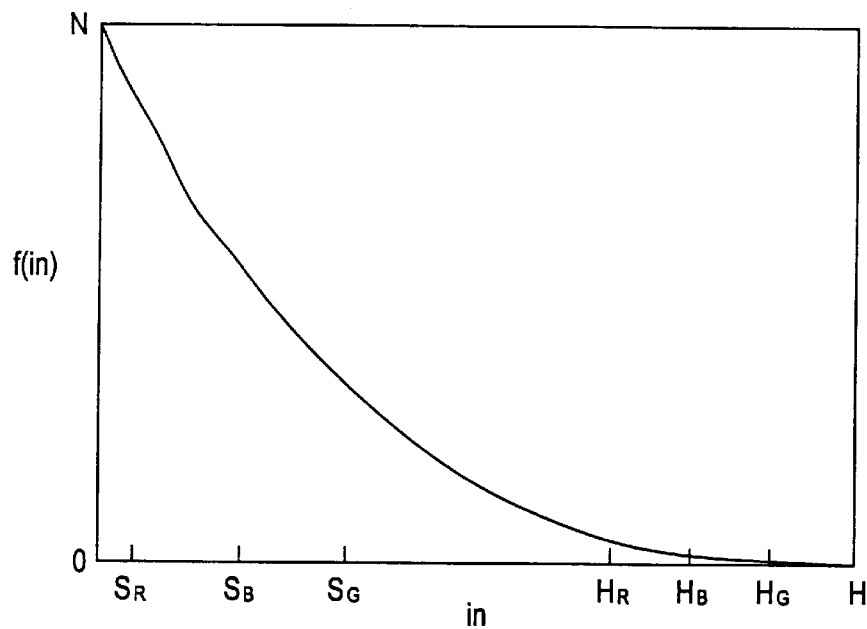
FIGS. 5A and 5B are explanatory diagrams showing one example of a conventional negative gradation conversion table.
Figure 5B:
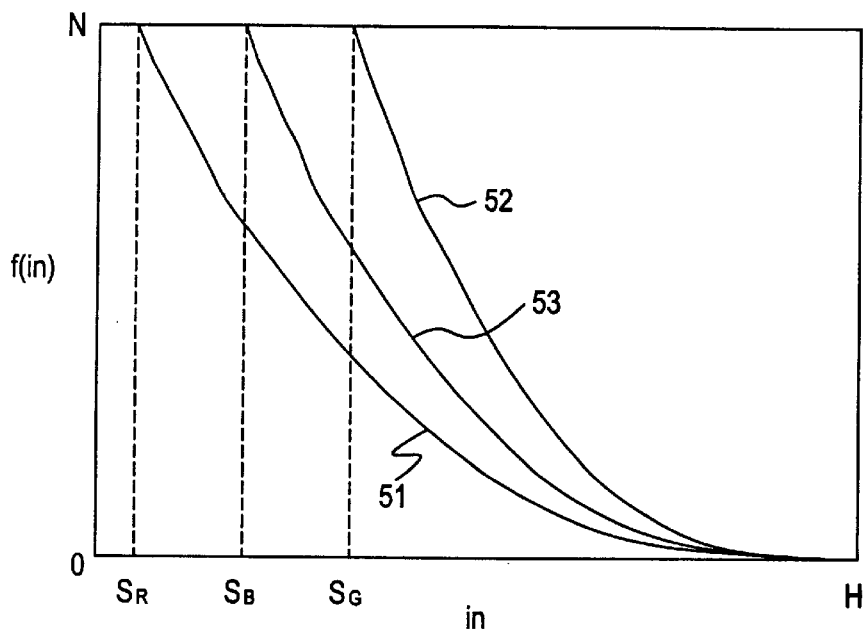

Accordingly, the negative gradation conversion table which is obtained is as shown in FIG. 4B, and the table equation is as follows.

NegaTable[in]=N, $(0 \leq in < S)$
NegaTable[in]=N(f((in$-S_c$)·N/(N$-S_c$))/N)^$\gamma_c$, $(S_c \leq in \leq N)$ Furthermore, the CPU 1 merges the negative gradation conversion table obtained as described above into the look-up table 14, and uses this in the picture image input in the subsequent main scan. Through this, the converted picture image does not have a purplish red hue in the main scan.

In the above description, the CPU 1 creates a negative gradation conversion table, but this is intended to be illustrative and not limiting. Naturally, it would also be acceptable for the CPU 1 to first send the data which is input by the prescan to the host computer 1:3 via the interface control circuit 4 and for the negative gradation conversion table to be created in the host computer 13. Furthermore, it would also be acceptable for the negative gradation conversion table created in the host computer 13 to be passed to the CPU 1 via the interface control circuit 4 and to be merged into the look-up table 14.

In addition, in the present embodiment the gradation conversion of picture image data in the main scan is accomplished using a table resulting from merging the basic negative gradation conversion table and the correction gradation conversion table, but this is intended to be illustrative and not limiting. It would be acceptable to accomplish gradation conversion using the basic negative gradation conversion table without merging these, and to then accomplish gradation conversion using the correction gradation conversion table.

What is claimed:

1. A picture image processing method, comprising the steps of:

inputting picture image data of a negative picture image, the data being decomposed into a plurality of colors;

setting a shadow point for each of the plurality of colors, each of the shadow points corresponding to a substantially minimum brightness value of the input picture image data for the corresponding color;

creating, for each of the plurality of colors, a base gradation conversion table which outputs a maximum value at least when the shadow point for the corresponding color is input to the base gradation conversion table; and creating, for each of the plurality of colors, a correction gradation conversion table which can be merged with the base gradation conversion table for the corresponding color to create a post-merge gradation conversion table for the corresponding color, each color's correction gradation conversion table being created such that, for output values of the post-merge gradation conversion table of each color that are equal to or greater than a predetermined value, a difference between gradients of the post-merge gradation tables of each color is less than a difference between gradients of the base gradation conversion tables of each color.

2. The method of claim 1, wherein:

the correction gradation conversion tables are respectively created so that averages of the gradients of the post-merge gradation conversion tables are equal in a range in which the output values of the post-merge gradation conversion tables are the predetermined value or greater.

3. The method of claim 2, wherein:

substantially maximum brightness values of the input picture image data corresponding to each of the plurality of colors are respectively set as highlight points;

intermediate values are computed by multiplying the values of the highlight points by a preset coefficient; and the correction gradation conversion tables are respectively created so that the post-merge gradation conversion tables output the predetermined value when the input value is higher than the shadow point by the amount of the intermediate value.

4. The method of claim 1, wherein:

a gradation conversion process is accomplished on the picture image data of the negative picture image which has been input, using the post-merge gradation conversion tables.

5. The method of claim 1, wherein:

a gradation conversion process is accomplished on the picture image data of the negative picture image which has been input, by separately using the base gradation conversion tables and the correction gradation conversion tables.

6. A picture image processing apparatus, comprising:

means for inputting picture image data of a negative picture image, the data being decomposed into a plurality of colors;

means for setting a shadow point for each of the plurality of colors, each of the shadow points corresponding to a substantially minimum brightness value of the input picture image data for the corresponding color;

means for creating, for each of the plurality of colors, a base gradation conversion table which outputs a maximum value at least when the shadow point for the corresponding color is input to the base gradation conversion table; and means for creating, for each of the plurality of colors, a correction gradation conversion table which can be merged with the base gradation conversion table for the corresponding color to create a post-merge gradation conversion table for the corresponding color, each color's correction gradation conversion table being created such that, for output values of the post-merge gradation conversion table of each color that are equal to or greater than a predetermined value, a difference between gradients of the post-merge gradation tables of each color is less than a difference between gradients of the base gradation conversion tables of each color.

7. The apparatus of claim 6, wherein:

the correction gradation conversion tables are respectively created so that averages of the gradients of the post-merge gradation conversion tables are equal in a range in which the output values of the post-merge gradation conversion tables are the predetermined value or greater.

8. The apparatus of claim 7, further comprising:

means for setting as highlight points substantially maximum brightness values of the input picture image data corresponding to each of the plurality of colors; and means for computing intermediate values by multiplying the values of the highlight points by a preset coefficient;

wherein the correction gradation conversion tables are respectively created so that the post-merge gradation conversion tables output the predetermined value when the input value is higher than the shadow point by the amount of the intermediate value.

9. The apparatus of claim 6, wherein:

a gradation conversion process is accomplished on the picture image data of the negative picture image which has been input, using the post-merge gradation conversion tables.

10. The apparatus of claim 6, wherein:

a gradation conversion process is accomplished on the picture image data of the negative picture image which has been input, by separately using the base gradation conversion tables and the correction gradation conversion tables.

11. A picture image processing apparatus, comprising:

an input device for inputting picture image data of a negative picture image, the data being decomposed into a plurality of colors; and a processor that sets a shadow point for each of the plurality of colors, each of the shadow points corresponding to a substantially minimum brightness value of the input picture image data corresponding to each of the plurality of colors; creates, for each of the plurality of colors, a base gradation conversion table which outputs a maximum value at least when the shadow point for the corresponding color is input to the base gradation conversion table; and creates, for each of the plurality of colors, a correction gradation conversion table which can be merged with the base gradation conversion table for the corresponding color to create a post-merge gradation conversion table for the corresponding color, each color's correction gradation conversion table being created such that, for output values of the post-merge gradation conversion table of each color that are equal to or greater than a predetermined value, a difference between gradients of the post-merge gradation tables of each color is less than a difference between gradients of the base gradation conversion tables of each color.

* * * * *